(No Model.)  3 Sheets—Sheet 1.

G. G. BUCKLAND.
ROAD LOCOMOTIVE.

No. 321,005.  Patented June 30, 1885.

Witnesses,
Geo. H. Strong.
J. S. Rouse

Inventor,
G. G. Buckland
By
Dewey & Co.
Attorneys

N. PETERS, Photo-Lithographer, Washington, D. C.

(No Model.)  3 Sheets—Sheet 3.

G. G. BUCKLAND.
ROAD LOCOMOTIVE.

No. 321,005. Patented June 30, 1885.

Witnesses,
Geo. H. Strong.
J. A. House

Inventor,
G. G. Buckland
By
Dewey & Co.
Attorneys

UNITED STATES PATENT OFFICE.

GEORGE GARDNER BUCKLAND, OF TULARE, CALIFORNIA.

ROAD-LOCOMOTIVE.

SPECIFICATION forming part of Letters Patent No. 321,005, dated June 30, 1885.

Application filed April 9, 1885. (No model.)

*To all whom it may concern:*

Be it known that I, GEORGE G. BUCKLAND, of Tulare city, Tulare county, State of California, have invented an Improvement in Road-Locomotives; and I hereby declare the following to be a full, clear, and exact description of the same.

My invention relates to a new and useful road-locomotive, the object of which is to serve as a traction-engine for ordinary roads.

My invention consists in a main frame, the forward portion of which is carried by peculiarly-mounted wide-rimmed wheels, which encircle and inclose a boiler and engine carried by the frame, and from which the front wheels are driven by suitable power-transmitting mechanism.

The rear portion of the frame is carried by smaller wheels peculiarly mounted in a pivoted or swiveling truck-frame, and connected with the front wheels by power-transmitting mechanism, whereby all the wheels are drivers.

It further consists in the steering-gear, and in details of construction and arrangement, all of which I shall hereinafter fully describe.

The object of my invention is to provide a practical road-locomotive.

Figure 1:
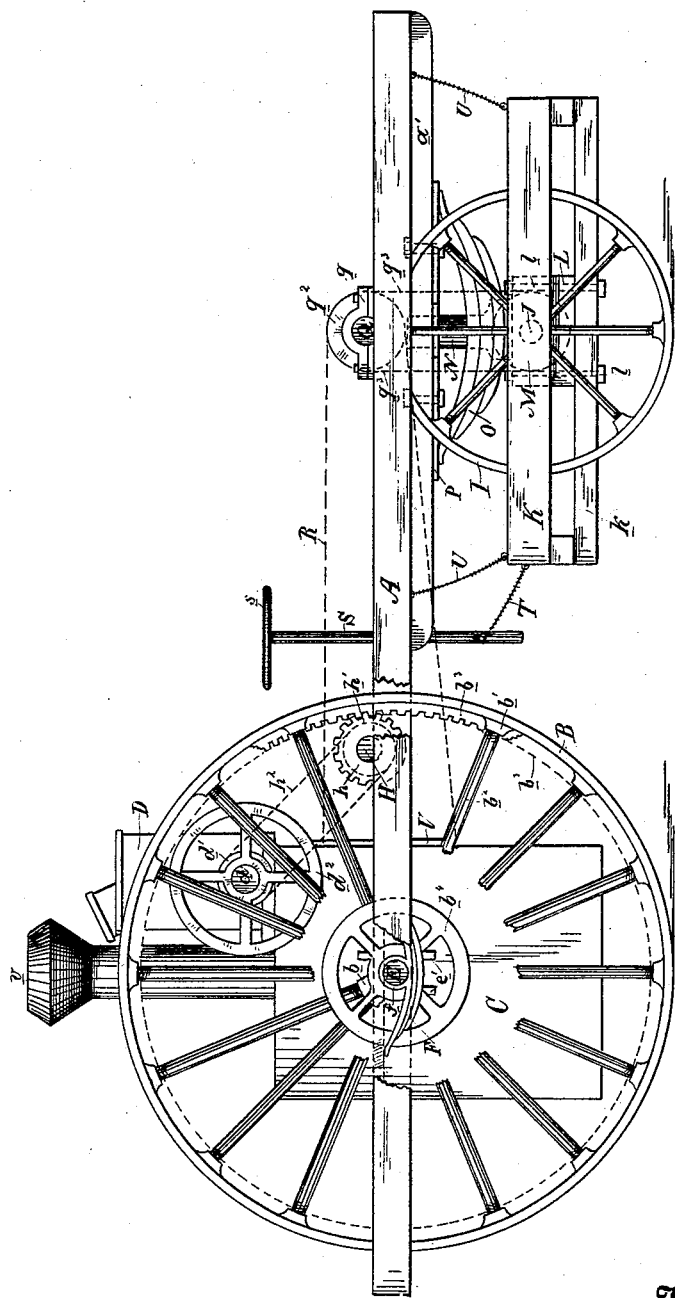
Figure 2:
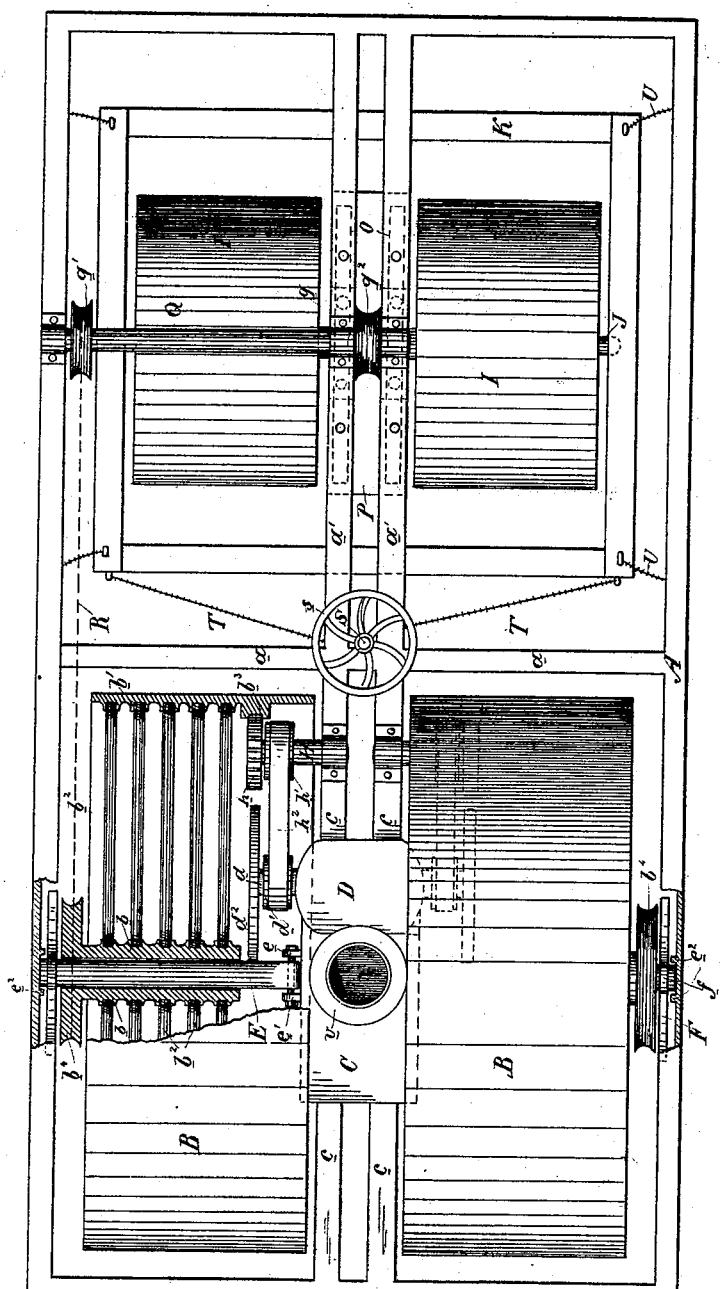
Figure 3:
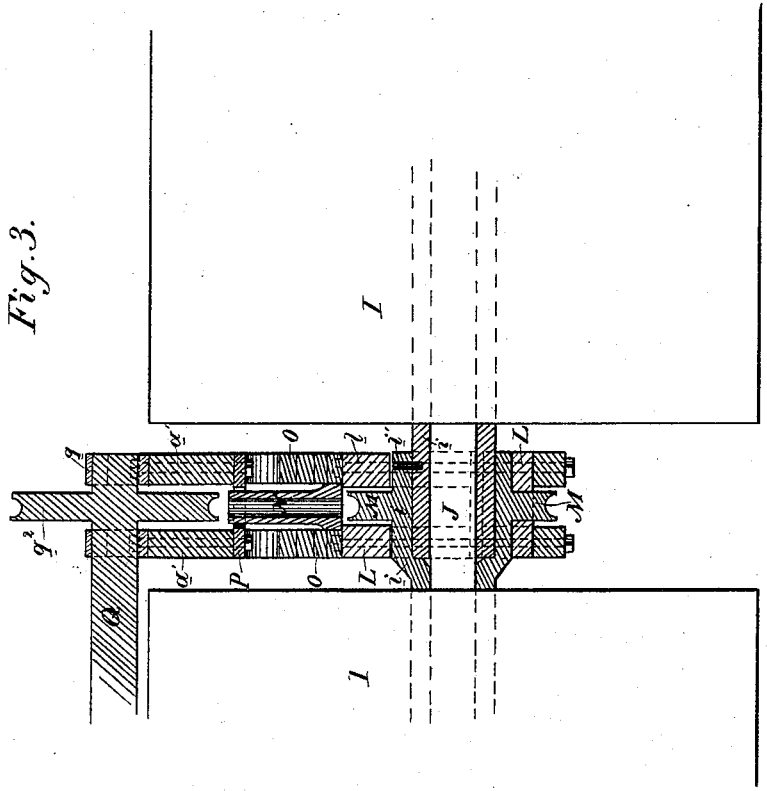

Referring to the accompanying drawings, Figure 1 is a side elevation of my locomotive. Fig. 2 is a plan of same. Fig. 3 is a cross-section through axis of the rear wheels.

A is the main frame, rectangular in shape, and preferably made of angle-iron bars or strips secured together.

The frame is divided into two sections by a central transverse bar, $a$, from which two parallel and spaced bars, $a'$, Fig. 2, extend to the rear of the frame. These bars occupy a lower horizontal plane than the remainder of the frame, as is shown in Fig. 1.

Within the forward section of the main frame are the large front wheels, B B. These consist of perforated hubs $b$, wide rims $b'$, and gas-pipe spokes $b^2$, screwed into hub and rim, as shown in Fig. 2. Together these wheels occupy very nearly all the space of the forward section of the frame, and are made this wide to increase their tractile power, which may be further augmented by ribs on their rims, similar to those on the wheels of some agricultural machines.

C is the boiler carrying the engine D, having a driving-shaft, $d$. The boiler and engine both occupy a position within and between the wheels B B, the spokes of which stop short of their inner edges, thus affording space for the boiler and engine, as shown in Fig. 2. These parts are supported in their position as follows: From the boiler extend forwardly and rearwardly the spaced bars $c$, which are bolted securely to the front of the frame and the divisional cross-bar $a$, Fig. 2. E are the axles. They are independent of each other, one for each wheel. They pass through the hollow hubs of the wheels, and have their inner ends pivoted by bolts $e$ to grooved bearings $e'$ on the sides of the boiler, Fig. 2, whereby they may have a vertical pivotal action. Their outer ends fit within vertically grooved or slotted bearings $e^2$ on the inner surface of the sides of the main frame, as shown in Fig. 2, whereby they may move vertically, as described, and thus permit the wide bearing-wheels B B to accommodate themselves to the inequalities of the ground.

Upon the outer ends of the axles E are fitted sleeves $f$, to which are secured the springs F, Fig. 1, which carry the front portion of the main frame.

Upon the inner surface of the inner portion of the rim of the wheels is formed an annular gear-band, $b^3$, with which mesh pinions $h$ on a counter-shaft, H, mounted on the boiler-supporting bars $c$, Fig. 2. This shaft carries also pulleys $h'$, from which belts $h^2$ extend to pulleys $d'$ on the driving-shaft $d$ of the engine, and by these means power is transmitted from the engine to the wheels B B. Fly-wheels $d^2$ are on the ends of the engine-shaft. Within the spaces of the rear section of the main frame formed by the spaced bars $a'$ are the smaller rear wheels, I I, of similar construction to the wheels B B. They are mounted loosely on a single axle, J, the ends of which are mounted in a rectangular frame or truck, K, which is provided with spaced longitudinal central bars, $k$, Figs. 1 and 2. The hubs $i$ of the two wheels I I telescope on their inner ends, the hub of one being enlarged to receive that of the other, as shown in Fig. 3. A hole, $i'$, is here shown for the purpose of receiving a pin, (not shown,) whereby both wheels may be made to act in conjunction, and by the removal of the pin they may act independently for the purpose of turning corners. The pin therefore acts as a clutch, and it may be operated by any suitable means, unnecessary here to show.

Upon the central bars of the truck-frame K is a boxing, L, for the hubs of the wheels. This is a two-part boxing, Fig. 3, secured together and to its seat by bolts $l$. The boxing is, moreover, longitudinally slotted to receive the sheave M, Fig. 3, which is secured on the outer hub of one of the wheels I. Formed with or secured to the center of the top half of boxing L is the steering center or pin N, and resting on said boxing on each side of the steering-center are the springs O, Fig. 1.

Bolted under the longitudinal bars $a'$ of the main frame, Fig. 1, is a slotted plate, P, in which the upper end of the steering-center N is fitted. Said plate also rests on the springs O, whereby the rear portion of the frame A is supported.

Mounted transversely across one-half of the rear portion of frame A, Fig. 2, is a counter-shaft, Q, the outer end of which is journaled in a box on one side of the main frame, and its inner end is journaled in a high box, $q$, on the bars $a'$, Fig. 3. The outer end of the counter-shaft Q carries a pulley, $q'$, from which a belt, R, extends to a pulley, $b^4$, on the outer end of the hub $b$ of the forward wheels, Fig. 2.

The inner end of the counter-shaft carries a sheave, $q^2$, from which a belt, $q^3$, extends to the sheave M on the outer hub of the rear wheel, I, Fig. 1. By these means the power of the front wheels is transmitted to the rear wheels, and all become drivers.

Mounted in the center of the frame is a spindle, S, having a crank, $s$, on its top. T are chains secured to the forward sides or ends of the truck-frame K and the spindle S, whereby the machine is guided. U are safety-chains connecting the truck-frame with the main frame.

V is the fire-door of the boiler, and $v$ the smoke-stack, extending upwardly between the forward wheels.

The operation of the locomotive is as follows: The driver reaches the fire-door from behind and between the two front wheels. The driving-shaft $d$ of the engine, through the power-transmitting mechanism heretofore described, drives the forward wheels, which, through the connections described, transmit power to the rear wheels. The rear wheels are adapted to turn with their swiveling truck-frame, operated by spindle S, whereby the machine is steered. The frame is carried on suitable springs, and provision is made for conforming the great front wheels to inequalities of surface, and for causing the rear wheels to act independently or in conjunction, for the purpose of turning corners or moving straight ahead. The position of the motive power within and between the wheels is of decided advantage, both in saving space on the machine, in convenience in handling, and in protection for these parts; and, further, the weight is carried to advantage, being lowered and carried by the large wheels.

Having thus described my invention, what I claim as new, and desire to secure by Letters Patent, is—

1. In a road-locomotive, the main frame A and traction-wheels B, having wide flanged rims, as described, in combination with the boiler C, located within the circumference of and between the wheels, and carried by the main frame, the engine D, supported by the boiler, and having shaft $d$, and power-transmitting mechanism connecting said shaft with the wheels, substantially as herein described.

2. In a road-locomotive, the main frame A, and the boiler C and engine D, carried by the frame, in combination with the wide flanged or rimmed wheels B B, encircling and inclosing boiler and engine, the independent axles E, on which said wheels are loosely mounted, a pivot-connection between the inner ends of the axles and the boiler, and a vertically-playing spring-connection between their outer ends and sides of the main frame, whereby the wheels may adapt themselves to inequalities of surface, and power-transmitting devices between the engine and wheels, substantially as herein described.

3. In a road-locomotive, the main frame A, and the boiler C and engine D, carried by the frame, in combination with the wide flanged or rimmed wheels B B, encircling and inclosing boiler and engine, the independent axles E, on which the wheels are loosely mounted, the grooved bearings $e'$ on the sides of the boiler, and pins $e$, by which the inner ends of the axles are pivoted to the boiler, the vertically-slotted bearings $e^2$ on the sides of the frame, in which the outer ends of the axles play, the sleeves $f$ on the axles, and springs F on the sleeves, connecting the axles with the frame, for the purpose described, and power-transmitting devices between the engine and wheels, substantially as herein described.

4. In a road-locomotive, the main frame A, the boiler C, having bars $c$, by which it is supported from the main frame, and the engine D, carried by the boiler, in combination with the axles E, carried by the main frame and boiler, the wide-rimmed wheels B B, mounted on the axles, and encircling and inclosing the boiler and engine, and suitable mechanism for transmitting the power of the engine to the wheels, substantially as herein described.

5. In a road-locomotive, the main frame A, the boiler C, having bars $c$, by which it is supported from the main frame, and the engine D, carried by the boiler, and having shaft $d$, in combination with the axles E, carried by the main frame and boiler, the wide-rimmed wheels B B on the axles, and encircling the boiler and engine, and the power-transmitting mechanism consisting of the annular gear-bands $b^3$ on the wheels, the counter-shaft H on bars $c$, having pinions $h$, engaging gear-bands $b^3$, the pulleys $h'$ on said shaft, the pulleys $d'$ on the driving-shaft $d$, and the belts $h^2$, connecting said pulleys, all arranged and adapted to operate substantially as herein described.

6. In a road-locomotive, the frame supporting rear wheels, I, having independent hubs $i$, their inner ends telescoping, in combination with the axle J, passing through both hubs, and the swiveling or pivoted truck-frame K, in which said axle is mounted, substantially as herein described.

7. In a road-locomotive, the main frame A, having central longitudinal bars, $a'$, in combination with the wheels I I, having independent hubs, the axle J, passing through said hubs, the truck-frame K, by which the axle is carried, said frame having central longitudinal bars, $k$, the boxing L, secured centrally to the bars $k$, and receiving the hubs of the wheels, the steering-center N on the boxing, and pivoted in the main frame above, and the springs O on the boxing, and supporting the main frame, substantially as herein described.

8. In a road-locomotive, the frame A, having center bars, $a'$, in combination with the wheels I I, having hubs $i$, telescoping and clutching their inner ends, the axles J, passing through the hubs, the truck-frame K, by which the axle is carried, and having bars $k$, the slotted boxing L, secured centrally to bars $k$, and receiving the hubs of the wheels, the steering-center N on the boxing, and pivoted in the bars $a'$ of the main frame, the springs O on the boxing, and supporting the main frame, and the mechanism by which power is transmitted to said wheels, consisting of the central sheave, M, on one of the hubs $i$, the counter-shaft Q on the main frame, having a sheave, $q^2$, and the belt $q^3$, connecting sheaves $q^2$ and M, substantially as herein described.

9. In a road-locomotive, the main frame A, the forward wheels, B B, boiler C and engine D, and power-transmitting mechanism between engine and wheels, in combination with the rear wheels, I I, having hubs $i$, telescoping and clutching their inner ends, the axle J, passing through the hubs, the truck-frame K, by which the axle is carried, and having bars $k$, the slotted boxing L, secured centrally to bars $k$, and receiving the hubs of wheels I I, the steering-center N on the boxing and pivoted in the main frame above, the springs O on the boxing, supporting the rear of the frame, and the mechanism by which the power of the front wheels is transmitted to the rear wheels, consisting of the counter-shaft Q on the main frame, the pulley $q'$ on its end, the pulley $b^4$ on the hub of the forward wheel, and intervening belt, R, the sheave $q^2$ on the inner end of shaft Q, the sheave M on the outer hub of one of the wheels I, and intervening belt, $q^3$, all arranged and adapted to operate substantially as herein described.

10. A road-locomotive comprising the main frame A, the forward large wheels, B B, having wide rims, the boiler C and engine D, supported by the main frame within the circumference of the wheels B B, power-transmitting mechanism consisting of gears, pulleys, and belts between the engine and said wheels, the pivoted truck-frame K under the rear of the frame, the independent rear wheels, I I, in said truck-frame, and springs on said frame, supporting the main frame, power-transmitting mechanism consisting of pulleys and sheaves, shafts and belts connecting the front and rear wheels, and the rotating spindle S and chains T, by which the rear wheels are turned to guide the machine, substantially as herein described.

In witness whereof I have hereunto set my hand.

GEORGE GARDNER BUCKLAND.

Witnesses:
W. C. BRIERLY,
J. M. SHACKELFORD.